United States Patent [19]

Benway et al.

[11] Patent Number: 4,973,823
[45] Date of Patent: Nov. 27, 1990

[54] COLLET ASSEMBLY FOR CYLINDRICAL WORKPIECES

[75] Inventors: Ernest A. Benway, Mentor; Thomas J. Gardner, Kirtland, both of Ohio

[73] Assignee: Cajon Company, Macedonia, Ohio

[21] Appl. No.: 373,029

[22] Filed: Jun. 28, 1989

Related U.S. Application Data

[63] Continuation-in-part of Ser. No. 216,773, Jul. 8, 1988, Pat. No. 4,868,367.

[51] Int. Cl.⁵ ............................................. B23K 9/23
[52] U.S. Cl. .................................. 219/161; 269/268; 269/287
[58] Field of Search ............... 219/59.1, 60 R, 60 A, 219/60.2, 158–161; 228/28, 29, 212, 44.3, 44.5, 44.7, 48, 49.3; 269/127, 239, 266–270, 279, 280, 287

[56] References Cited

U.S. PATENT DOCUMENTS

| | | | |
|---|---|---|---|
| 1,594,903 | 8/1926 | Gray | 269/268 R X |
| 1,895,281 | 1/1933 | Currie | 269/268 R X |
| 2,471,006 | 5/1949 | Olson . | |
| 2,477,297 | 7/1949 | Giles et al. . | |
| 2,677,746 | 5/1954 | Duch et al. | 219/10 |
| 3,542,354 | 11/1970 | Fitzpatrick | 269/22 |
| 3,668,359 | 6/1972 | Emmerson | 219/60 A |
| 3,819,194 | 6/1974 | Grevich et al. | 279/23 |
| 3,995,845 | 12/1976 | Scheffer | 269/254 CS |
| 4,108,589 | 8/1978 | Bunch | 425/393 |
| 4,379,215 | 4/1983 | Rohrberg | 219/60 A |
| 4,868,367 | 9/1989 | Benway et al. | 219/161 |

Primary Examiner—Philip H. Leung
Assistant Examiner—David Osborn
Attorney, Agent, or Firm—Fay, Sharpe, Beall, Fagan, Minnich & McKee

[57] ABSTRACT

A clamping device for holding cylindrical workpieces having a nominal radius R which varies from a minimum of (R−A) to a maximum of (R+B), where A and B are the limits of the tolerance range for the nominal radius, includes opposed clamp halves each having a clamp face adapted to be moved toward and away from one another and each of the clamp halves carrying a rigid collet element adapted to engage on opposite sides of cylindrical workpieces when the clamp halves are moved toward one another. Each of the collet elements has a semi-cylindrical clamping surface extending inwardly from the clamp face of the respective clamp half. Each semi-cylindrical clamping surface has a radius substantially equal to (R+B) with the center of the radius being offset outwardly of the clamp face of the respective clamp half an amount at least equal to (A+B). Preferably, the center of the radius is offset an amount at least equal to (A+B+C), where C is the tolerance deviation permitted to the radius (R+C). Additionally, each clamping surface is comprised of individual surface portions mounted for independent flexing movement to allow the collet to further compensate for workpiece tolerance variations.

7 Claims, 3 Drawing Sheets

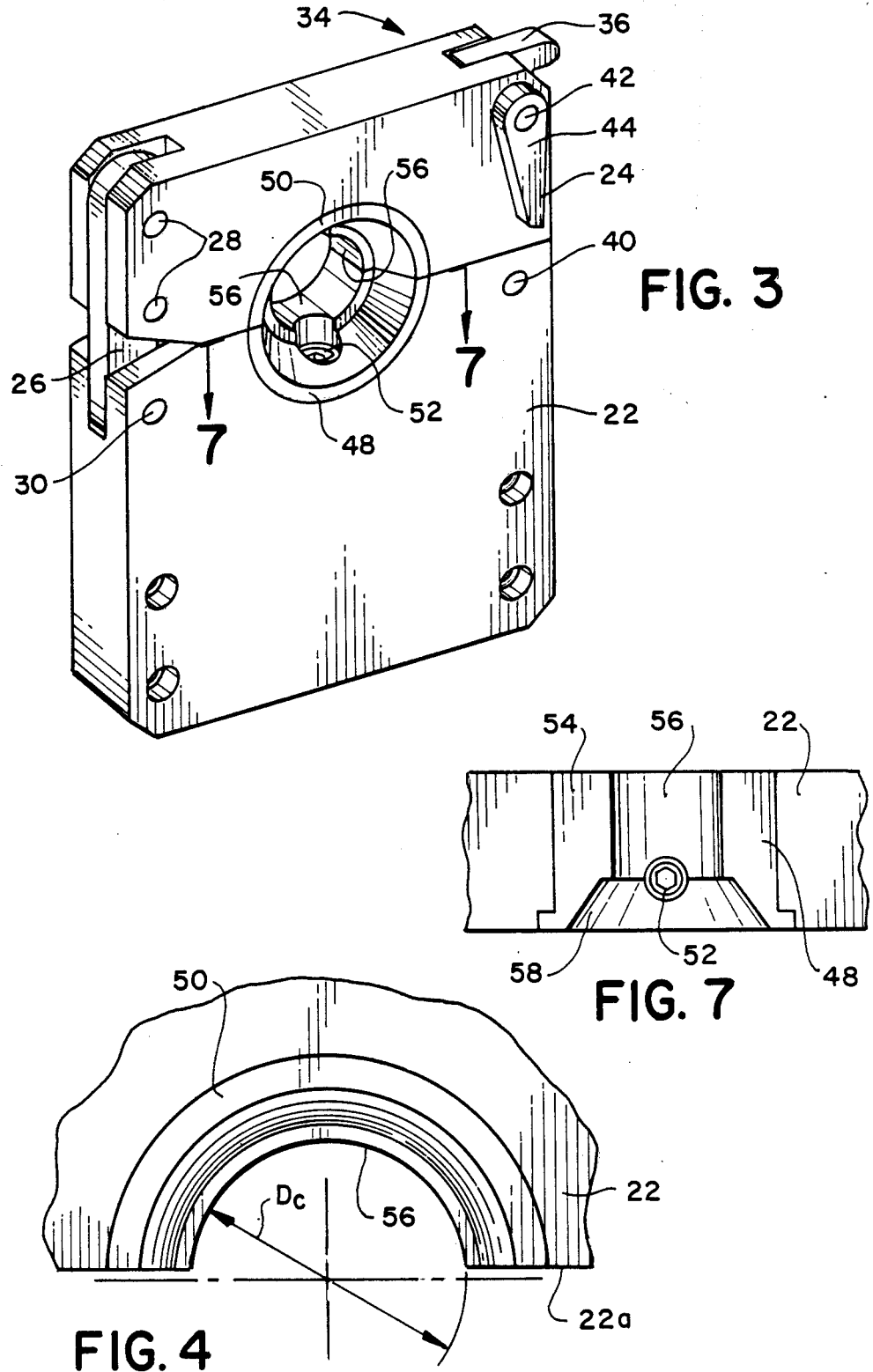

COLLET ASSEMBLY FOR CYLINDRICAL WORKPIECES

BACKGROUND OF THE INVENTION

This application is a continuation-in-part application of U.S. application Ser. No. 216,773 filed July 8, 1988 for "Rigid Collet Assembly for Cylindrical Workpieces" now U.S. Pat. No. 4,868,367, issued Sept. 19, 1989.

The subject invention is directed toward the art of work holders and, more particularly, to a rigid collet device for holding cylindrical workpieces.

The invention is especially suited for use as a tube clamp unit in an orbiting head tube welder and will be described with particular reference thereto; however, the invention is capable of broader application and could be incorporated in a wide variety of work holders and clamping units for different types of cylindrical work pieces.

In U. S. Pat. No. 4,379,215, issued Apr. 5, 1983, for "Orbital Cassette Welding Head", there is disclosed an apparatus for welding abutting tube sections. The apparatus includes an orbital welding head unit and a separate U-shaped tube clamp unit which holds the tube sections to be welded in abutting aligned relationship during the orbiting of the weld head about the tube ends. The tube clamp unit uses rigid collets to hold the tube sections in alignment during the welding operation.

The use of rigid collets for holding the tubing during the welding operation is much preferred as compared to split and/or adjustable collets or similar holding devices. The reason for this is that during the welding operation, thermal stresses tend to cause the tubing to move creating misalignment between the two sections. The movement is greater and/or more likely to happen with the split collets and the adjustable collets or holders. With respect to the solid or rigid collets, however, there are problems in assuring that tubing throughout the range of standard commercial tolerances can be held properly. That is, a typical commercially available tubing used for fluid systems and the like, has, for example, a nominal outside diameter of 0.50 inches which varies ±0.005 inches. It has been difficult to compensate for the diameter variations which result from the tolerance variations and, at times, it has been difficult to properly hold the tubing during the welding operation.

As can be appreciated from the foregoing, the need persists for a collet design which allows the maintenance of the rigid collet form while providing compensation for the outer diameter variations which result from tolerance variations.

BRIEF SUMMARY OF THE INVENTION

The subject invention provides a collet design and clamping unit which overcomes the noted problems and provides ready compensation for tubing tolerance variations. With the use of the subject invention, the rigid collet construction can be used to eliminate tubing movement and/or misalignment and overcome the internal stresses generated from the heat of the welding operation.

In particular, the subject invention provides a clamping device particularly intended for clamping cylindrical tubes having a nominal diameter D which varies from a minimum of $(D-T_1)$ to a maximum of $(D+T_2)$. The device comprises a pair of opposed clamp elements mounted for movement toward and away from one another. Each clamp element has a clamp face carrying a rigid collet element with each collet element having a semi-cylindrical clamping surface extending inwardly from the clamp face of the 1, respective clamp element. The diameter $D_2$) with the center of the diameter $D_c$ of the semi-cylindrical clamping surface being offset outwardly of their respective clamping face a combined amount of at least $\frac{1}{2}(T_1+T_2)$.

By forming the fixed collets as described, compensation takes place for the outer diameter size variation due to tolerance variations in the tubing being held. That is, the collet will function to hold the tubing rigidly from the minimum tubing diameter encountered to the maximum diameter. Full closing and firm tubing engagement is assured throughout the full tolerance variation of tubing.

In accordance with a more limited aspect of the invention, the diameter $D_c$ is preferably offset outwardly of the clamp face of the respective clamp half by an amount at least substantially equal to one half of $(T_1+T_2+T_3)$ where $T_3$ is the tolerance deviation for the diameter $D_c$. This takes into account the tolerance to which the clamping faces can be bored or machined. Thus, slight tolerance variations in the actual forming of the respective clamp halves does not adversely affect the overall functioning of the camp halves.

In accordance with a still further aspect of the invention, each of the collet elements is removably connected to its clamp half and includes an end cavity to compensate for any length tolerance variation or to accept any forging bosses or the like which may appear on the tubing or tube fitting being held by the collet. This design variation allows the clamping halves and collets to function for a wide variety of tube fittings in addition to tube sections per se.

According to a further aspect of the invention, the clamping surface of each collet element is comprised of a plurality of individual clamping surface portions which are mounted for flexing movement about axes which are parallel to the semi-cylindrical clamping surface. Preferably, each collet element has two uniformly sized clamping surface portions which are integral with the main body of the collet element but are connected thereto in a cantilever fashion to allow them to resiliently flex to further accommodate variations in workpiece size.

Accordingly, a primary object of the invention is the provision of a tube clamping assembly which compensates for tubing outer diameter changes that result from tolerance variations.

A still further object of the invention is the provision of an assembly of the type described which can hold tube and fitting elements in precision face-to-face aligned relationship for butt welding.

Yet a further object of the invention is the provision of an apparatus of the type described wherein the tubing or fitting elements are held by solid collets which are designed to compensate for outer diameter variations in the tubing or tube fittings.

BRIEF DESCRIPTION OF THE DRAWINGS

The above and other objects and advantages of the invention will become apparent from the following description when read in conjunction with the accompanying drawings wherein:

FIG. 3 is a perspective view of the clamp component shown in FIG. 2;

FIG. 4 is a partial end view of one half of a fixed collet element used to illustrate the manner in which the collet clamping surface is formed;

FIG. 7 is a view taken on line 7—7 of FIG. 3;

DETAILED DESCRIPTION OF THE PREFERRED EMBODIMENT AND ALTERNATE EMBODIMENTS

Figure 1:
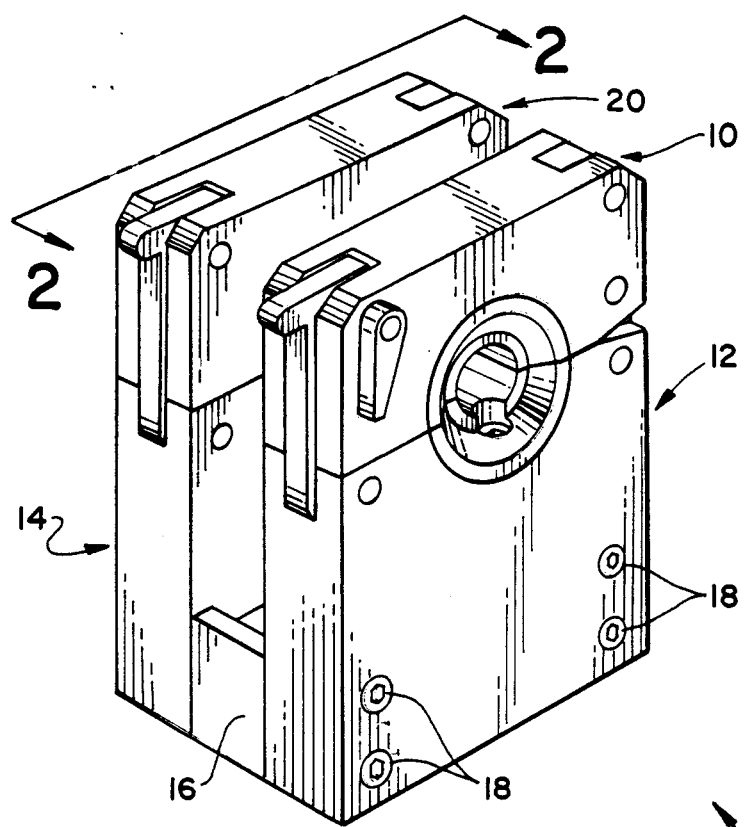
FIG. 1 is a pictorial view of a tube clamping assembly formed in accordance with a preferred embodiment of the subject invention.

Referring more particularly to the drawings wherein the showings are for the purpose of illustrating a preferred embodiment of the invention only, and not for the purpose of limiting same, FIG. 1 shows a tube clamp assembly 10 which is intended to be used with an orbital cassette welding head assembly of the type generally shown and described in U.S. Pat. No. 4,379,215 of Apr. 5, 1983. The assembly 10 is designed to hold two tubing sections in aligned relationship with their facing ends generally abutting so that an orbital welding head can rotate about the mating tube ends to perform a butt weld operation. The disclosure of U.S. Pat. No. 4,379,215 is incorporated herein by reference and reference should be had thereto for a more complete description of the welding cassette and its relationship to the assembly 10.

The tube clamp assembly 10 broadly includes a pair of clamping units 12 and 14 which are joined to the opposite sides of an intermediate spacer member 16. The various components are formed from stainless steel, aluminum, or the like and the clamp units 12 and 14 are removably joined to the spacer block 16 in any convenient manner such as through the use of machine screws 18. The clamp units 12 and 14 are joined to the spacer member 16 to form a somewhat U-shaped structure with the open center section 20 adapted to receive the orbital welding cassette which carries and drives the welding electrode in a manner more fully described in the aforementioned U. S. patent.

Figure 2:
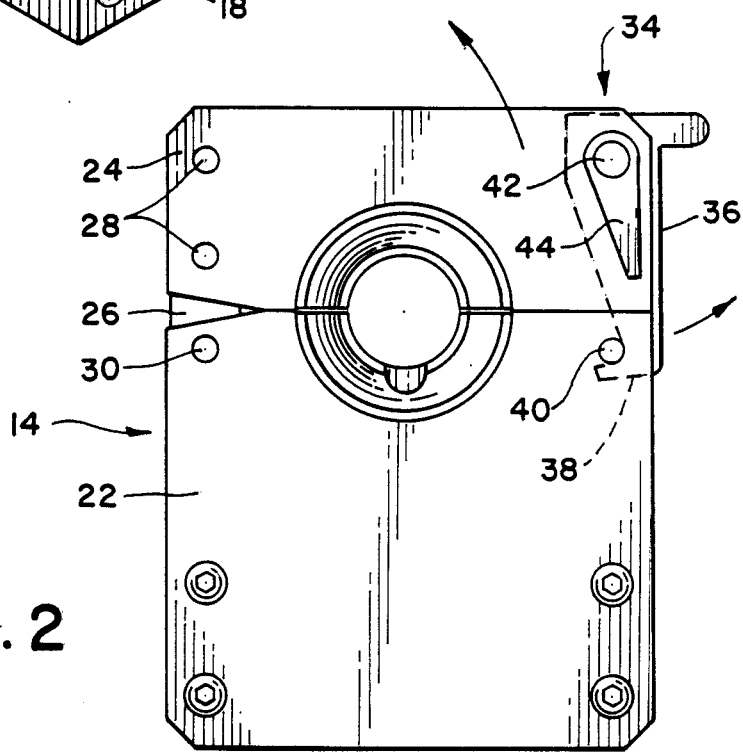
FIG. 2 is an elevational view taken on line 202 of FIG. 1.

In the embodiment under consideration, the clamping units 12 and 14 are of generally identical construction except that they are mirror images of one another. Accordingly, a description of the clamp unit 14 is to be taken as equally applicable to unit 12 unless otherwise noted. As best shown in FIGS. 2 and 3, the clamp unit 14 comprises a pair of opposed clamp halves 22 and 24. Each of the clamp halves 22 and 24 are preferably of rigid, solid construction and are joined by hinge means which permit the clamp halves to be moved toward and away from one another. Specifically, in the subject embodiment, the clamp halves 22 and 24 are joined by a hinge plate 26 which is fixed to the upper clamp half 24 by a pair of pins or the like 28. The lower end of the hinge plate 26 is suitably received in a slot in the lower half 22 and is pivotally connected thereto by a hinge pin 30.

The two clamp halves 22 and 24 are releasably connected in their engaged or clamping position by a releasable latch or lock assembly 34. Many different types of lock assemblies could be provided; however, according to the preferred embodiment, the lock assembly 34 includes a swinging hook element 36 which is pivoted to the upper clamp half 24 and has a hook portion 38 which engages a transverse pin 40 as shown in FIG. 2. An eccentric pivot pin 42 extends through the upper end of the hook member 36 and is rotated through an external lever 44. By rotating the hook plate 36 to the dotted line position shown in FIG. 2 and rotating the eccentric 42, the hook portion 38 is caused to tightly engage the pin 40 and pull the two clamp halves tightly together.

Each of the clamp halves 22 and 24 carries a rigid collet element with the collet elements in each half cooperating to define opposed semi-cylindrical work piece clamping or engaging surfaces. More particularly, as shown in FIGS. 2 and 3, separate, identical rigid collet elements 48 and 50 are releasably carried in the camp halves 22, 24 respectively. As illustrated, the collet elements are releasably connected to their respective clamp half by socket head machine screws or the like 52. As more particularly illustrated in FIG. 7, the collet elements comprise a generally semi-cylindrical rigid body 54 having a semi-cylindrical clamp surface 56 formed therein. Preferably, at the entrance end to the semi-cylindrical clamping surface 56, there is a somewhat conical or tapered mouth portion 58 which is significantly wider and allows fitting bodies or forging bosses to be accommodated while the tubing section is clamped and extends through the semi-cylindrical clamping surface 56.

The apparatus thus far described is capable of rigidly and tightly engaging the outer diameter of tubing of a particular size depending on the diameter of the clamping surface 56. By changing the collet elements 48, 50, the clamp assembly can be made to accommodate a variety of different tubing or fitting sizes. Additionally, by changing the collets in open unit relative to those in the mating unit, it is possible to bring into alignment tubings or fittings of different sizes such that it is possible to weld various tube and fitting combinations.

Commercially available tubing typically is manufactured to a nominal outer diameter which varies plus and minus depending on the tolerance range. The design of the subject rigid collets is such as to compensate for these tolerance variations and permit the clamping units to firmly engage and positively hold the tubing sections irrespective of their particular variation within the accepted tolerance range.

Referring in particular to FIG. 4 (which is a greatly enlarged elevational view of the collet element 50), the subject invention can best be explained. According to the subject invention, the semi-cylindrical tube gripping surface 56 is formed with a diameter which is equal to the maximum tubing diameter which is expected to be encountered for the nominal tubing size for which the collet is designed. That is, the surface 56 is bored to a diameter equal to the nominal tubing diameter plus the tolerance variation for that particular nominal diameter. For example, with one half inch nominal diameter, a normal tolerance range is from ±0.005 inches. Thus, the clamping surface is bored to a diameter of 0.505. In addition, the center line of the bore which defines the surface 56 is offset outwardly from the clamping face of the respective clamp half. As illustrated in FIG. 4, the center of the bore diameter $D_c$ is offset from the respective clamp face 22a an amount equal to the total of the tubing tolerance plus the collet outside diameter fit tolerance divided by two. That is, the total tubing tolerance plus the total collet outside diameter fit tolerance divided by two assures that each clamp half will be able to properly clamp even the smallest tubing. This is illustrated more satisfactorily in FIGS. 5 and 6.

Figure 5:
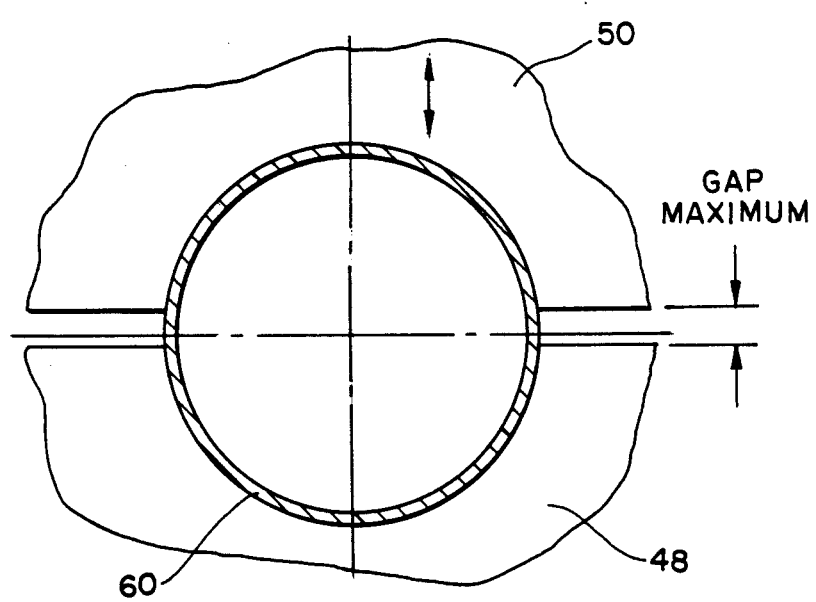
FIG. 5 is a partial elevational view, somewhat diagrammatic, showing the clamp or fixed collet elements in engagement with a tubing whose outer diameter is at a maximum within its tolerance range.

Referring specifically to FIG. 5, this figure illustrates a tube 60 which is clamped between the collet elements 48 and 50. Tube 60 in this illustration has the maximum outer diameter encountered for this particular nominal tubing size. That is, the tubing is at its maximum tolerance variation. In this instance, when the clamp halves 22 and 24 come together there is significant spacing between the opposed clamp faces and the faces of the respective collets 48 and 50.

Figure 6:
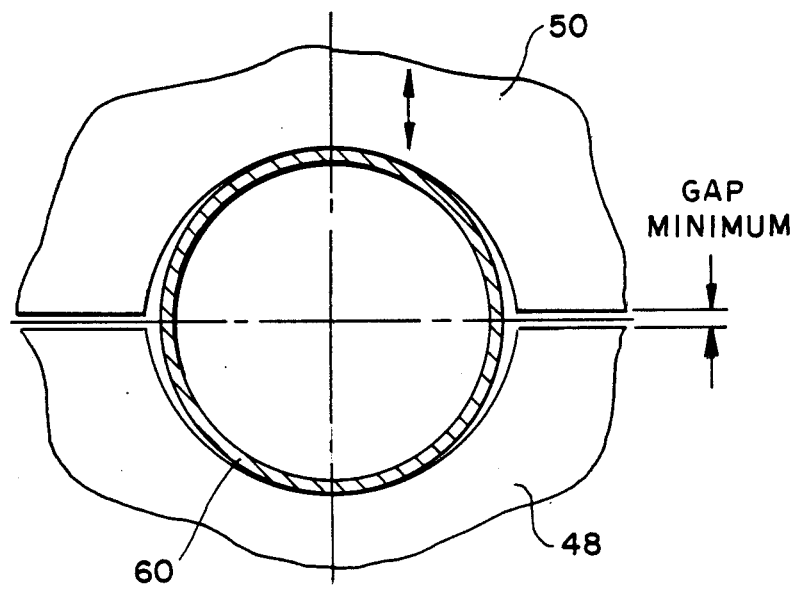
FIG. 6 is a view similar to FIG. 5 but showing the collet elements in engagement with a tubing of minimum diameter within its tolerance range.

FIG. 6 illustrates the clamping function when the tubing 60 has a minimum outer diameter as dictated by the maximum tolerance variations in the negative direction. Specifically, as illustrated in FIG. 6, the gap between the collet elements 48 and 50 is at a minimum. However, the collets firmly engage the outer diameter of the tube at the diametrically opposed faces as illustrated. By offsetting the center of the semi-cylindrical clamp surface 56 in the manner shown in FIG. 4 and as described earlier, the collet has the proper design to properly engage the minimum tube outer diameter.

Figure 8:
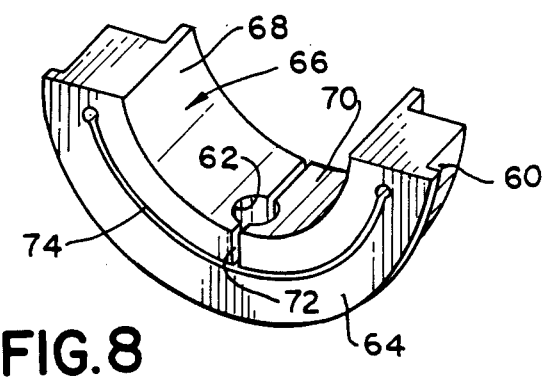
FIG. 8 is a pictorial view of a modified form of collet element.
Figure 9:
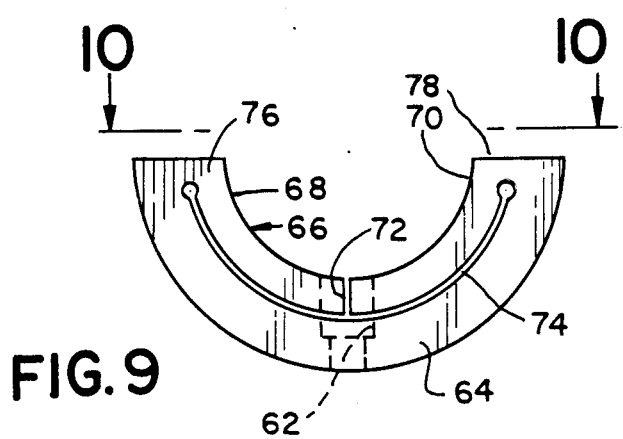
FIG. 9 is a front elevational view of the collet element of FIG. 8.
Figure 10:
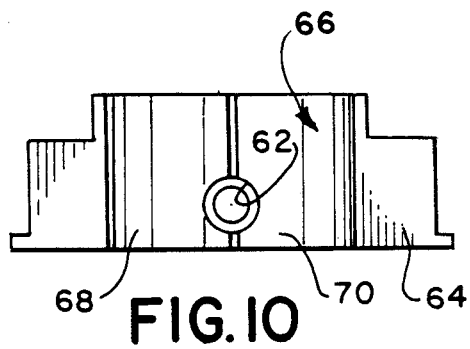
FIG. 10 is a view taken on line 10—10 of FIG. 9.

FIGS. 8 through 10 illustrate a modified form of collet element which further facilitates the ability of the clamp unit to adapt to cylindrical work pieces which vary from the nominal size. More particularly, this embodiment allows the clamp assembly to properly clamp work pieces throughout a greater tolerance range. The 8 through 10 embodiment uses collet elements which have a closely similar construction to those discussed with respect to FIGS. 1 through 7 embodiment. In particular, it should be understood that a pair of the FIG. 8 through 10 collets are mounted in the opposed clamp halves 22, 24 in the manner previously discussed. That is, pair of the collet elements 60 are mounted in the opposed clamp halves 22, 24 through the use of a suitable socket head machine screw such as screw 52 illustrated in FIG. 3. For this purpose, each of the collet elements 60 include a stepped diameter bore 62.

The collet element 60 comprises a generally semi-cylindrical rigid body 64 which provides a semi-cylindrical clamp surface 66. Clamp surface 66 is preferably sized, formed and located in the manner previously discussed with reference to surface 56 of the elements 48, 50. Additionally, the collet elements 60 are sized and spaced so that their semi-cylindrical clamping surface 66 mates and engages cylindrical work pieces in the manner shown and discussed with reference to FIGS. 5 and 6. In addition, however, in order to allow the collet 60 to further adapt to the tolerance variations and to compensate for deviations from true cylinder shape in the work pieces, the clamping surface 66 is subdivided into a plurality of individual clamping surface portions 68, 70. Each of the surface portions 68, 70 are arranged for flexure movement about axes which extend parallel to the respective clamp surface 66. More particularly, as illustrated, each of the clamping surface portions 66, 70 are carried on a separate collet section which is integral with the main collet body 64 but joined thereto in cantilever fashion. As best shown in FIGS. 8 and 9, the sections of the collet carrying the portions 68, 70 are separated from the main collet body 64 by a radially extending slot portion 72 and a circumferentially extending slot 74. Thus, the surface portions 68, 70 are joined to the main collet body 64 by relatively narrow webbed sections 76, 78 respectively.

The slots 72, 74 could be formed in many different ways. However, in the subject embodiment they are formed by an EDM operation and have the general shape illustrated. By controlling the thickness of the connecting webs 76, 78 and taking into account particular material from which the collets are formed, it is possible to closely control the resiliency or flexibility of the collet portions which carry the individual clamping surface portions 68, 70. The amount of flexure and adjustability provided by this arrangement is, of course, relatively small, but is more than adequate to cover the usual tolerance ranges found in tubing and fittings of the type generally intended to be clamped by the subject assembly. Referring to FIG. 6 it should be understood that the flexibility provided by the FIGS. 8 through 10 embodiment is such as to allow a somewhat greater portion of the clamping surface area to engage with the exterior of the work piece. In addition, however, variations in the shape of the work piece from the true cylinder can also be accommodated by the subject modification.

Obviously, collets formed in accordance with the subject invention could be used in a variety of structures and clamping assemblies. Accordingly, it is intended to include all such modifications and alterations as part of the invention insofar as they come within the scope of the appended claims.

What is claimed is:

1. In a tube clamping device for holding cylindrical tubing sections and wherein the tubing sections have a nominal outer diameter D which varies from a minimum of $(D-T_1)$ to a maximum of $(D+T_2)$ (where $T_1$ is the maximum tolerance deviation below the nominal outer diameter and $T_2$ is the maximum tolerance deviation above the nominal outer diameter), said clamping device including a pair of opposed clamp halves each having a clamp face adapted to be moved toward and away from one another, each of said clamp halves carrying a collet element adapted to engage on opposite sides of one of said tubing sections when said clamp halves are moved toward one another, the improvement wherein each of said collet elements has a semi-cylindrical inner clamping surface extending inwardly from the clamp face of the respective clamp half, the inner diameter Dc of each semi-cylindrical clamping surface being substantially equal to $(D+T_2)$ with the center of the inner diameter Dc being offset outwardly of the clamp face of the respective clamp half by an amount at least equal to $\frac{1}{2}(T_1+T_2)$, and each semi-cylindrical inner clamping surface comprising a plurality of individual clamping surface portions mounted for independent flexing movement.

2. The tube clamping device of claim 1 wherein the individual clamping surface portions are capable of flexing movement about axes parallel to the semi-cylindrical clamping surfaces.

3. The tube clamping device of claim 1 wherein each semi-cylindrical clamping surface is comprised of two of the individual clamping surface portions.

4. The tube clamping device of claim 3 wherein the individual clamping portions are mounted for flexing movement about axes parallel to the semi-cylindrical clamping surfaces.

5. A clamping device for clamping cylindrical tubes having a nominal outer diameter D which varies from a minimum of $(D-T_1)$ to a maximum of $(D+T_2)$ (where $T_1$ is the maximum tolerance deviation below the nominal outer diameter and $T_2$ is the maximum tolerance deviation above the nominal outer diameter) comprising a pair of opposed clamp elements mounted for movement toward and away from one another, each clamp element having a clamp face carrying a collet element with each collet element carrying a semi-cylindrical inner clamping surface extending inwardly from the clamp face of the respective clamp element with the inner diameter $D_c$ of each semi-cylindrical clamping surface being substantially equal to $(D+T_2)$ with the center of the diameters $D_c$ of the semi-cylindrical inner clamping surfaces being offset outwardly of their respective clamping face a combined amount of at least $\frac{1}{2}(T_1+T_2)$, each semi-cylindrical inner clamping surface being comprised of a plurality of individual clamping surface portions joined to said collet in a cantilever manner to permit flexing of said clamping surface portions about axes extending parallel to said semi-cylindrical inner clamping surface.

6. A clamping device as set forth in claim 5 wherein each semi-cylindrical inner clamping surface is comprised of two individual clamping surface portions which join to the respective collet at locations which are generally diametrical opposite one another.

7. A clamping device a set forth in claim 5 wherein each semi-cylindrical inner clamping surface is comprised of individual clamping surface portions which are integral with their respective collet.

* * * * *